United States Patent [19]

Fagerstedt et al.

[11] Patent Number: 4,575,841
[45] Date of Patent: Mar. 11, 1986

[54] METHOD AND APPARATUS FOR THROUGH-CONNECTION TESTING IN A DIGITAL TELECOMMUNICATION NETWORK

[75] Inventors: Nils U. H. Fagerstedt, Hurstpierpoint, England; Sture G. Roos, Bergshamra, Sweden; Franko Stipcevic, Mill Park, Australia

[73] Assignee: Telefonaktiebolaget LM Ericsson, Stockholm, Sweden

[21] Appl. No.: 581,786

[22] PCT Filed: May 17, 1983

[86] PCT No.: PCT/SE83/00195
  § 371 Date: Jan. 13, 1984
  § 102(e) Date: Jan. 13, 1984

[87] PCT Pub. No.: WO83/04355
  PCT Pub. Date: Dec. 8, 1983

[30] Foreign Application Priority Data

May 26, 1982 [SE] Sweden .................................. 8203279

[51] Int. Cl.[4] ............................. H04J 1/16; H04J 3/14
[52] U.S. Cl. ............................................. 370/14; 370/15
[58] Field of Search ............................. 370/14, 13, 15; 179/175.31 R

[56] References Cited

U.S. PATENT DOCUMENTS

| | | | |
|---|---|---|---|
| 3,739,098 | 6/1973 | Camiciottoli et al. | 370/15 |
| 3,830,982 | 8/1974 | Christiansen | 370/13 |
| 4,048,445 | 9/1977 | Ghisler | 370/14 |
| 4,149,038 | 4/1979 | Pitroda et al. | 370/14 |
| 4,296,492 | 10/1981 | Hafer | 370/14 |

Primary Examiner—Douglas W. Olms
Assistant Examiner—Wellington Chin
Attorney, Agent, or Firm—Roberts Spiecens Cohen

[57] ABSTRACT

The invention relates to a method and apparatus in duplex transmission of digital information between subscribers connected to terminals associated with each other in a telecommunication network of the time multiplex type in which information is transmitted in the form of binary words in specially assigned time slots, of carrying out with the aid of parity check, during traffic in progress, through-connection testing for checking that a correct connection has been set up after a switching path has been established. The through-connection check is started and detected in the same station (terminal). After detected correct parity, which is done with the aid of a parity check means (M1) and a comparison circuit (OR), there is generated a parity bit with intentional incorrect polarity for sending on the line towards the next station. Generation of desired parity is done with the aid of an apparatus including a local processor (MP), a control memory (CM), a counter (TR) and said comparison circuit. All stations along a switching path are of equal value and contain the same means. A central processor assigns one of the stations (TCT), at the setting up of a connection, to be the control station for the through-connection test. The control bit with intentionally incorrect parity is switched straight through remaining switching points and is looped in the line terminal (PCM2) where information from the B subscriber is received. The loop connection is carried out with the aid of a parity check circuit (M2) for extracting the parity bit from the terminal side, and a further parity check circuit (M3) for the loop formation itself and feeding out the parity bit back towards the TCT station. A check is made in the latter that it is the intentionally erroneous parity bit which is detected, and if this is the case the correct parity is sent, subsequent to which it is awaited that the correct parity will traverse the switching path and once again be detected in the TCT station. After this detection, a signal is sent to the central processor that the through-connection test is completed, after which this control is broken off and normal parity monitoring takes over, the latter not being embraced by the invention, however.

11 Claims, 3 Drawing Figures

METHOD AND APPARATUS FOR THROUGH-CONNECTION TESTING IN A DIGITAL TELECOMMUNICATION NETWORK

TECHNICAL FIELD

The invention relates to a method and apparatus in a telecommunication system for checking, with the aid of so-called through-connection testing, the establishment and existence of a duplex connection for transmitting digital information in a time division multiplexed bus network, to which subscribers are connected via line terminals.

BACKGROUND ART

A method is disclosed, e.g., in the Swedish Patent No. 7410475-3, for through-connection testing in a digital exchange of a telecommunication system. The method is characterized by erroneous parity intentionally being introduced into the digital character flow to an input on an exchange, after steps have been taken to set up a connection between the input and a given output at the exchange, subsequent to which such output is scanned with respect to erroneous parity, and that information relating to the result of this scanning indicating an erroneously or correctly established connnection, is transmitted to a central control unit.

DISCLOSURE OF INVENTION

The problem with the known method is that it is entirely under the control of a central control unit controlling all activity relating to the through-connection test, resulting in substantial time delay and complicated hardware. Neither is the method utilizable in a larger switching network with a larger number of exchanges or terminals. The test is limited solely to the exchange. The method is based on parity being checked on the receive side under control of the central processor and established on the send side also under control of the central processor. It is thus necessary to take active steps both on the send and receive side of a connection.

The method and apparatus in accordance with the invention, which solves this problems which is characterized by the claims is utilizable in a multiprocessor system, and is not under the control of any central procesor. The through-connection test in accordance with the invention is based on the idea that monitoring to ensure that a connection has been set up and exists, is checked by one and the same terminal, i.e., the termianl transmitting the through-connection test also has the task of detecting it. This means that all other terminals along the path of the connection, e.g., processors and the PCM line terminals, only pass along the test message without taking any further steps. The embodiment of this invention is also based on an erroneous parity bit being added to the data samples. It is indeed possible to use other testing signals than erroneous parity, e.g., a particular check word or a particular check bit. The invention thus permits monitoring that a correct connection has been established in a duplex connection in a digital bus system. The through-connection test (TCT) for both halves of a duplex connection is initiated, and the result is checked at the same point (terminal) of the connection. A parity bit of intentionally wrong polarity is sent together with the speech sample and, is mentioned, the generation of the parity bit and the check of its polarity is performed in the same terminal (processor). In a multiprocessor system initiation and testing can thus be assigned to one and the same processor, which is not possible in the prior art.

BRIEF DESCRIPTION OF DRAWINGS

The apparatus in accordance with the invention is described in detail below with the aid of an embodiment, and with reference to the appended drawing, whereon.

MODE FOR CARRYING OUT THE INVENTION

Figure 1:
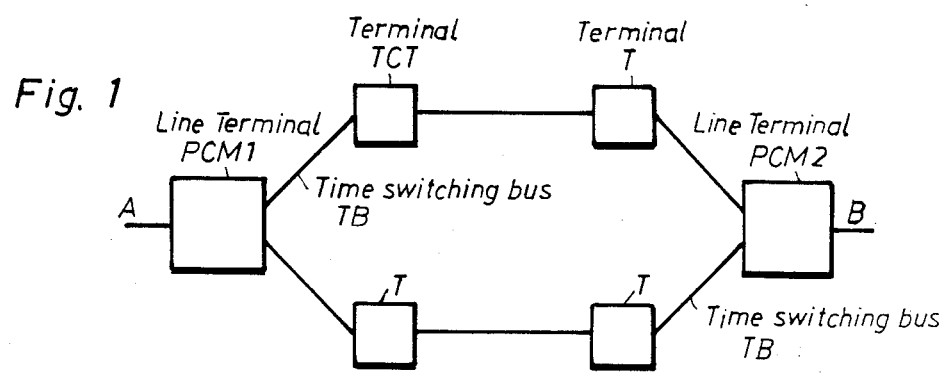
FIG. 1 is a traffic path diagram illustrating the establishment of a connection where the apparatus in accordance with the invention is incorporated.

As will be seen from FIG. 1, a digital switching network of the kind discussed contains a plurality of terminals T, which are digital, processor-controlled exchanges, one of these terminals denoted TCT being appointed to carry out the through-connection test in the network. The terminals T are connected to each other via time multiplexed buses TB (Time Switch Bus). Subscriber-connected PCM line terminals PCM 1 and PCM 2 are also connected to the terminals T. In the line terminals are carried out, inter alia, analogue/digital conversion and digital/analogue conversion respectively from and to the line outside the digital network structure.

A duplex connection can be considered as set up between two subscribers in directions A to B and B to A. The actual setting up of the connection in the time multiplexed stage is not accounted for, since this is known in the prior art. A normal parity check is made in a manner known per se in the TCT station for ensuring that a switching path has been set up at all. If any connection point is incorrect, erroneous parity is obtained, indicating such as non-operated switching points, i.e., switches which has not been set up. The switch causes erroneous parity when it is not activated.

When correct parity is established, i.e., a correct connection has been set up through the network, the through-connection check is carried out by intentionally generating erroneous (complimentary) parity from that terminal (selector point) TCT which has been assigned by a central processor CP (not shwon) at the setting up instant for carrying out the through-connection test. For this test it is only in the TCT-terminal that correct parity is awaited. All other switching points in the established connection are switched through, whether parity is correct or erroneous, i.e., outgoing parity is the same as incoming parity. The intentioanlly generated erroneous parity bit is taken round the whole switching path and returns as input data to the TCT station, where it is detected. When it has been detected, correct parity is sent to the network. Correct parity is then awaited, for ensuring that all registers along the switching path are emptied of erroneous parity. The central processor is then informed that the connection is correctly set up. A microprocessor MP in the TCT station can decide whether correct or incorrect parity shall be sent. Odd parity is said to be correct parity. For detected erroneous parity (not intentionally generated) correct parity is sent. For a disapproved through-connection test, the central processor makes a new setting up attempt. An alarm is given for repeated unsuccessful connection attempts. The TCT station is usually the station which is situated closest to the A subscriber.

The intentionally applied erroneous parity is tied the whole time to given channels through the different stations along the switching path. The advantage of this is that no switch can be incorrectly operated without this being discovered at the through-connection test.

Figure 2:
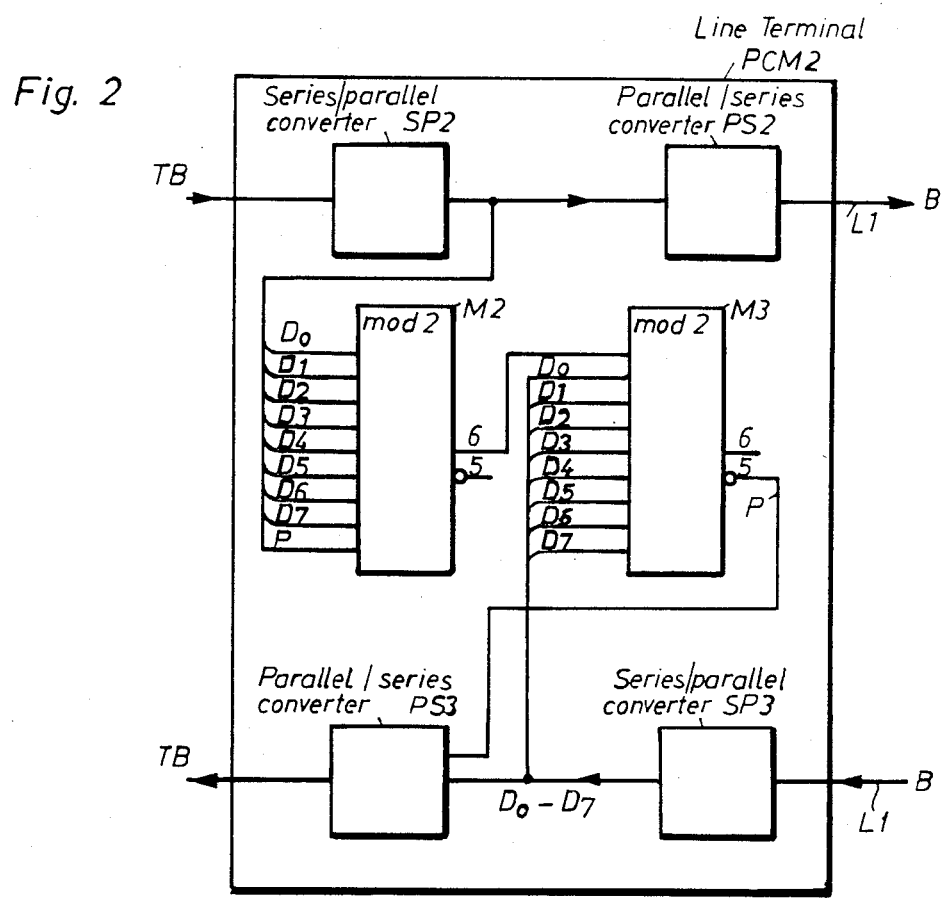
FIG. 2 depicts a line terminal in the switching network with the apparatus in accordance with the invention shown in a block diagram.

FIG. 2 illustrates the parts applicable to the invention incorporated in a line terminal e.g., terminal PCM 2.

In transmitting a call in a direction from the subscriber A to the subscriber B, binary information is received in series form from the switching terminals on an input to a series parallel converter SP2 of the 74LS395 type in the line terminal PCM 2. Since it is a question of a time division system the speech information in transmitted in the form of samples each comprising eight bits and a parity bit. After conversion to parallel form, the speech samples and the parity bit are applied to the inputs on a parallel/series converter PS 2 of the 74LS395-type for further dispatch on a line L1, e.g., to the subscriber B. Such signals from the output on the converter SP2 are also applied to the inputs on a modulo-2 adder M2 of the 74LS280-type, in which a parity check takes place in a known manner, i.e., a check whether the parity is odd or even, and in conformity therewith a parity bit is sent to the input of a modulo-2 adder M3 of the 74LS280-type. The speech samples from the subscriber B are applied to the input on a series/parallel converter SP3 in the line terminal PCM 2. After conversion, the signals are supplied in parallel form to the inputs on a parallel/series converter PS3 for trasmission on the time bus TB, and also to further inputs on modulo-2 adder M3, on the output of which a parity bit is sent answering to the parity bit and speech sample from the subscriber B supplied to the inputs. Speech samples from the subscriber B thus depart from the converter PS3 with a parity bit inserted in the line circuit, this parity bit being obtained without information exchange with, and control from some common central processor, but only by a simple loop connection process. Outgoing parity has the same polarity as incoming parity.

Figure 3:
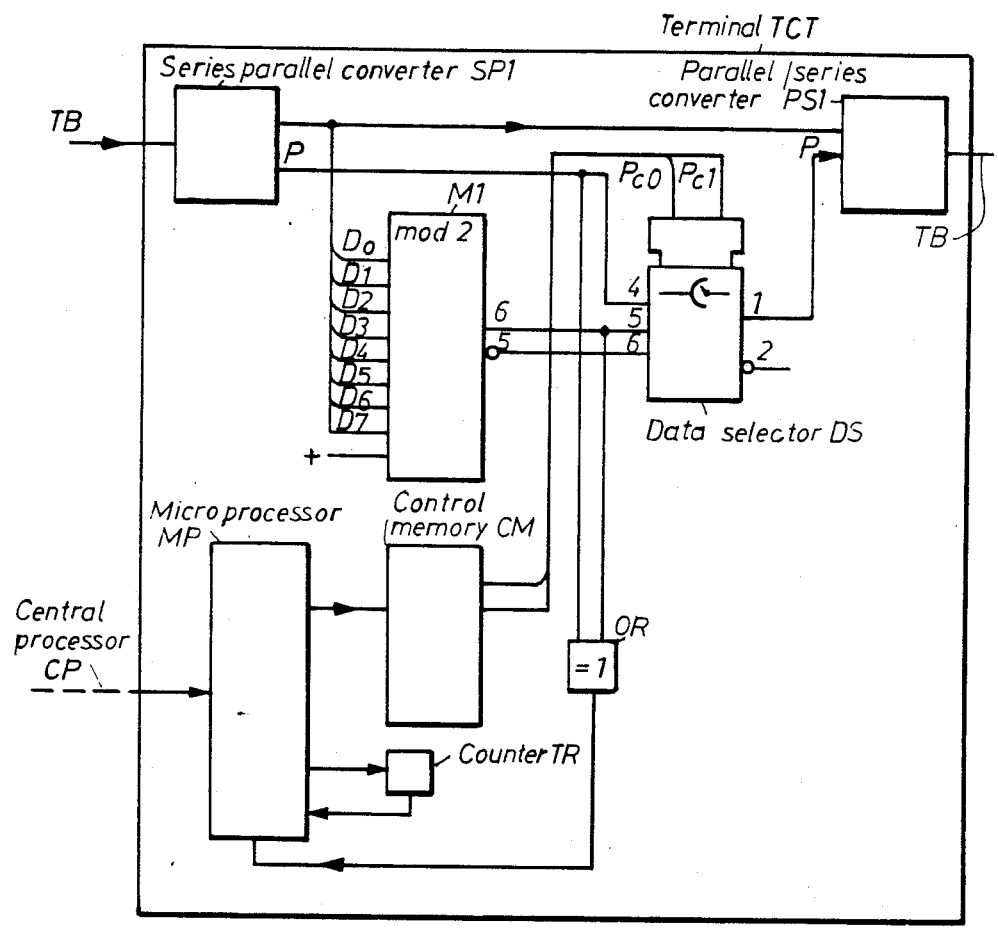
FIG. 3 is a block diagram of a digital terminal for carrying out the through-connection test.

In FIG. 3 there are shown the necessary circuits included in the terminal TCT for carrying out the through-connection test, this terminal being selected to control the test at the setting up of the connection. Such circuits are also included in remaining terminals T, since all terminals are the same.

A 74LS395-type series/parallel converter SP1 receives the speech sample with the parity bit from the time bus TB on its input. The binary speech samples are forwarded to a parallel/series converter PS1 of the type 74LS395 for feeding out to the line in series form. The speech samples from the output on the converter SP1 are furthermore applied to the inputs of a modulo-2 adder M1 of the type 74LS280, while the parity bit from the bus is supplied to a first data input on a data selector DS of the type 74LS153. A signal at a constant level, e.g., corresponding to a logical one, is applied to an input on the modulo-2 adder. The parity signal formed by the addition is sent from a first output of the modulo-2 adder M1 to a second input on the data selector DS. The inverted parity bit is sent from a second output on the adder to a third input on the data selector. The signal from this first parity output on the adder M1 is compared in an exclusive-OR gate, denoted by OR, of the type 74LS882 with the parity bit obtained from the converter SP1. If needed, the result of the comparison can be read in a local processor MP, this being a microprocessor made by MOTOROLA with the number M6801. At the start of a through-connection test the microprocessor MP is given an order from the unillustrated central processor CP to carry out the through-connection test, the microprocessor then writing into a control memory CM, of the type 2148 made by Intel, that the correct parity shall be sent, i.e., the value 01 corresponding to the odd parity. A condition counter TR of the type 74LS161 is set to zero simultaneously by the microprocessor. The task of the condition counter is to control the reaction of the microprocessor to the incoming parities. Control signals are sent from two outputs on the control memory to the corresponding control inputs PC0 and PC1 on the data selector DS. For PC0=0 and PC1=1 odd parity is sent via the input 5-output 1 of the data selector to the input on the parallel/series converter PS1. This parity signal is sent through the network and received on the input of the TCT terminal. For equality between the compared parity signals, the circuit OR sends a logical zero signal meaning correct parity and, providing that the condition counter TR is at 0, results in that the microprocessor steps the counter TR one step and changes the control word in the memory CM, which thereby sends intentionally erroneous parity (even parity) corresponding to the logical signal 10. When the control inputs are activated by the signal 10 even parity is sent via the input 6 to the converter PS1 from the data selector.

For difference between the compared parity signals, the circuit OR sends a logical one signal resulting in that, provided that the condition counter TR is at one, the microprocessor MP steps the counter one step and changes the control word in the memory CM to correct parity, i.e., odd (01), which is sent out on the bus via the data selector. When this correct parity is once again detected, and providing that the condition counter TR is at position 2, the microprocessor steps the counter a further step (3) and sends a control signal to the central processor denoting that the through-connection test is completed. The value 3 on the condition counter TR signifies that regard will no longer be taken to incoming parities.

In a terminal T, not designated as a control terminal for the through-connection test, the condition counter TR is put in the position 3 at the setting-up instant and the control memory CM is loaded with the value 00, incoming parity thus being fed via the input 4-output 1 of the data selector DS to the input on the parallel/series converter PS1 and to the line.

What is claimed is:

1. In a time mutiplex type of telecommunication network wherein there is a duplex transmission of digital information in the form of binary words with a parity indicator in specially assigned time slots between subscribers connected via a plurality of terminals arranged in a loop, the method of performing a through-connection test during the transmission of the digital information, comprising the steps of assigning a first value of parity as a correct value with any other value of parity being incorrect, assigning an arbitrary one of said terminals as a monitor terminal, causing all other terminals to transfer any binary word as received around the loop, said monitor terminal first appending to a binary word received thereby with a parity indicator such that the parity of the binary word has said first value and then transmitting the so-modified binary word, upon receipt after transfer around the loop of said so-modified binary word by said monitor terminal, said monitor terminal performing a parity test, if said test indicates that said so-modified binary word has a correct value of parity, said monitor terminal appending to another binary word a parity indicator such that the parity of said other binary word has a second value and transmitting said other binary word, upon receipt after transfer around the loop of said other binary word, said monitor terminal performing another parity test, if said other parity test indicates that said other binary word has an incorrect value of parity, said monitor terminal transmitting all subsequent binary words with the parity value as received.

2. The method of claim 1 wherein said parity indicator is a single bit whereby parity values can be changed by changing the value of the single bit.

3. The method of claim 1 further comprising, if said other parity test indicates said other binary word has a correct value of parity, the first further step of appending to a further binary word a parity indicator such that the parity of said further binary word has an incorrect value of parity and upon receipt, after transfer around the loop, of said further binary word said monitor terminal performing a further parity test.

4. The method of claim 3 further comprising the step of said monitor terminal dependent on the result of the further parity test either giving an alarm or transmitting all subsequent binary words with the parity value as received.

5. In a time multiplex type of telecommunication network wherein there is a duplex transmission of digital information in the form of binary words with a parity bit between first and second subscribers, said binary words being in specifically assigned time slots, apparatus for through-connection testing during the transmission of the digital information comprising:
first and second subscriber lines connected to said first and seocnd subscribers respectively;
first and second line terminals respectively connected to said first and second subscriber lines, each of said line terminals having a line port, a bus output and a bus input, connecting means connecting said bus input to said line port whereby digital information at said bus input is transferred onto the associated subscriber line, means connecting said line port to said bus output whereby digital information at said line port is transferred to said output port, and means for appending to the binary word at said bus output the same parity bit as the binary word being received at said bus input;
a first set of terminals each having a bus input and a bus output and transfer means for transferring from the bus input to the bus output the binary words including a parity bit unchanged;
first bus means for serially connecting said first set of terminals from the bus output of said first line terminal to the bus input of said second line terminal;
a second set of terminals each having a bus input and a bus output and transfer means for transferring from the bus input to the bus output the binary words including a parity bit unchanged;
second bus means for serially connecting said second set of terminals from the bus output of said second line terminal to the bus input of said first line terminal;
whereby a bus loop is formed; and at least one of the terminals of either of said sets further comprising:
controlled parity generating means responsive to at least first and second signals for causing the transmission of a received binary word with the received parity bit or the inverse of the received parity bit, respectively cyclicly energized control means for generating at least said first and second signals, means for initializing said control means to generate said first signal with the first receipt of a binary word, comparator means for stepping said cyclically energized control means to generate said second signal only if the parity of the binary word after transmission about the loop and rereceived at the bus input is the same as the parity of the binary word transmitted from the bus output so that the next transmitted binary word has a different parity whereby a further test can be performed.

6. The apparatus of claim 5 wherein said cyclically energized control means can be further stepped in response to said comparator means indicating that the parity bit of the binary word being received at the bus input has said different parity bit of this binary word as transmitted from the bus output, and said parity generating means including means responsive to the further stepping of said cyclically energized control means to pass binary words from the bus input to bus output with parity unchanged.

7. The apparatus of claim 6 wherein said controlled parity generator means comprises a modulo-2 adder having direct and inverse outputs and controlled data selector means having first and second inputs connected to said outputs.

8. The apparatus of claim 7 wherein said controlled data selector means has a third input connected to transfer means for receiving only a parity bit therefrom.

9. The apparatus of claim 5 wherein said comparator means comprises an exclusive-OR means.

10. The apparatus of claim 5 wherein the connecting means of said line terminal comprises a first modulo-2 adder responsive signals on the bus input and a second modulo-2 adder responsive to signals on said line port and signals from said first modulo-2 adder.

11. The apparatus of claim 5 wherein all the terminals of said first and second sets being identical.

* * * * *